Sept. 6, 1966 D. R. ANDREWS 3,271,034

POSITIONING MECHANISM

Filed Sept. 9, 1963 3 Sheets-Sheet 1

INVENTOR.
DALLAS R. ANDREWS
BY
[signature]
Attorney

Sept. 6, 1966 D. R. ANDREWS 3,271,034

POSITIONING MECHANISM

Filed Sept. 9, 1963 3 Sheets-Sheet 2

INVENTOR.
DALLAS R. ANDREWS
BY
Morris [signature]
Attorney

Sept. 6, 1966 D. R. ANDREWS 3,271,034

POSITIONING MECHANISM

Filed Sept. 9, 1963

3 Sheets-Sheet 3

INVENTOR.

DALLAS R. ANDREWS

BY [signature]

Attorney

United States Patent Office 3,271,034

Patented Sept. 6, 1966

3,271,034
POSITIONING MECHANISM

Dallas R. Andrews, Indianapolis, Ind., assignor to Radio Corporation of America a corporation of Delaware Filed Sept. 9, 1963, Ser. No. 307,493
4 Claims. (Cl. 274—4)

The present invention relates to object positioning mechanisms and particularly to mechanisms for positioning a magnetic head with respect to a magnetic tape record.

While the invention is especially useful in magnetic recording and reproducing machines, aspects of the invention may also have utility in other apparatus for positioning an object with respect to a member. One example of such additional utility for the invention is in positioning a tool with respect to a surface of a workpiece.

In magnetic recording and reproducing, a plurality of record tracks are often provided on a magnetic tape record, the tracks being offset laterally from each other. The tracks run longitudinally of the tape and are parallel to one edge thereof. It is generally the practice to utilize a multi-track recording head to record the record tracks. Such a head includes a plurality of head units which are offset laterally from each other with their gaps in alignment and perpendicular to the edge of the tape. The head units are in scanning relationship with the tracks and electrical inputs to or outputs from the units are electrically switched so as to apply the inputs to or derive the outputs from selected ones of the tracks. The magnetic tape record may be inverted with respect to head units in cases where the head units are offset from the center of the tape, thereby presenting different tracks to the head units. Then, alternate tracks are scanned, respectively, when the tape is in a first position and a second position inverted with respect to the first position.

It has also been proposed to mechanically shift, laterally with respect to the tape, a magnetic head having one or more head units, so as to successively bring the head unit or units into scanning relationship with different ones of the record tracks. Mechanisms for shifting the head have the advantage of requiring fewer head units for a given number of tracks than would be required with a stationary head. Thus, a cost saving would seemingly be realized by virtue of a need for a magnetic head having fewer core units and a less complicated electrical switching system. However, head shifting mechanisms in which such cost savings might be realized have not heretofore been satifactory for the reason that the accurate positioning and alignment of the head units when shifted from one track to another has not always been realized. Thus, the head-to-tape relationships may deviate widely from one track to another, resulting in unsatisfactory recording and reproducing performance, especially when a magnetic tape record recorded on one machine is reproduced on another.

Broadly speaking, it is an object of the present invention to provide improved mechanisms generally useful for positioning a member with respect to an object.

More particularly, it is an object of the present invention to provide an improved mechanism for positioning a magnetic head in a magnetic recording and reproducing machine.

It is a still further object of the present invention to provide an improved mechanism for positioning a magnetic head in a plurality of different positions with respect to a magnetic record while maintaining a corresponding given positional relationship of the head with respect to the record in every given position.

It is a still further object of the present invention to provide an improved mechanism for positioning a magnetic head in scanning relationship with any of a plurality of record tracks on a tape record, which mechanism does not disturb the azimuth and tilt of the magnetic head with respect to the tape.

The foregoing and other objects and advantages may be attained in apparatus embodying the invention for changing the position of a magnetic head from a first position to a second position by movement along a line between these positions. A mounting is provided which defines a path of movement for the head along a line parallel to the aforesaid line of movement. An element of the mounting is engageable with a cooperating head element and guides the head in its movement along the parallel line so as to prevent angular displacement of the head with respect to the parallel line. The head may be shifted or translated, as by lifting, so that it moves without angular displacement. The lifting means may index the head at either the first or second position. The head may include one or more units having the signal gaps in alignment with each other, along a line known as the gap line, and parallel to the aforesaid line of movement. This gap line is not tilted or otherwise angularly displaced as the head is shifted or translated by virtue of the mounting and guiding elements of the mechanism.

The invention itself, both as to its organization and method of operation, as well as additional objects and advantages thereof, will become more readily apparent from a reading of the following description, in connection with the accompanying drawings, in which.

Figures 1, 2, 3:
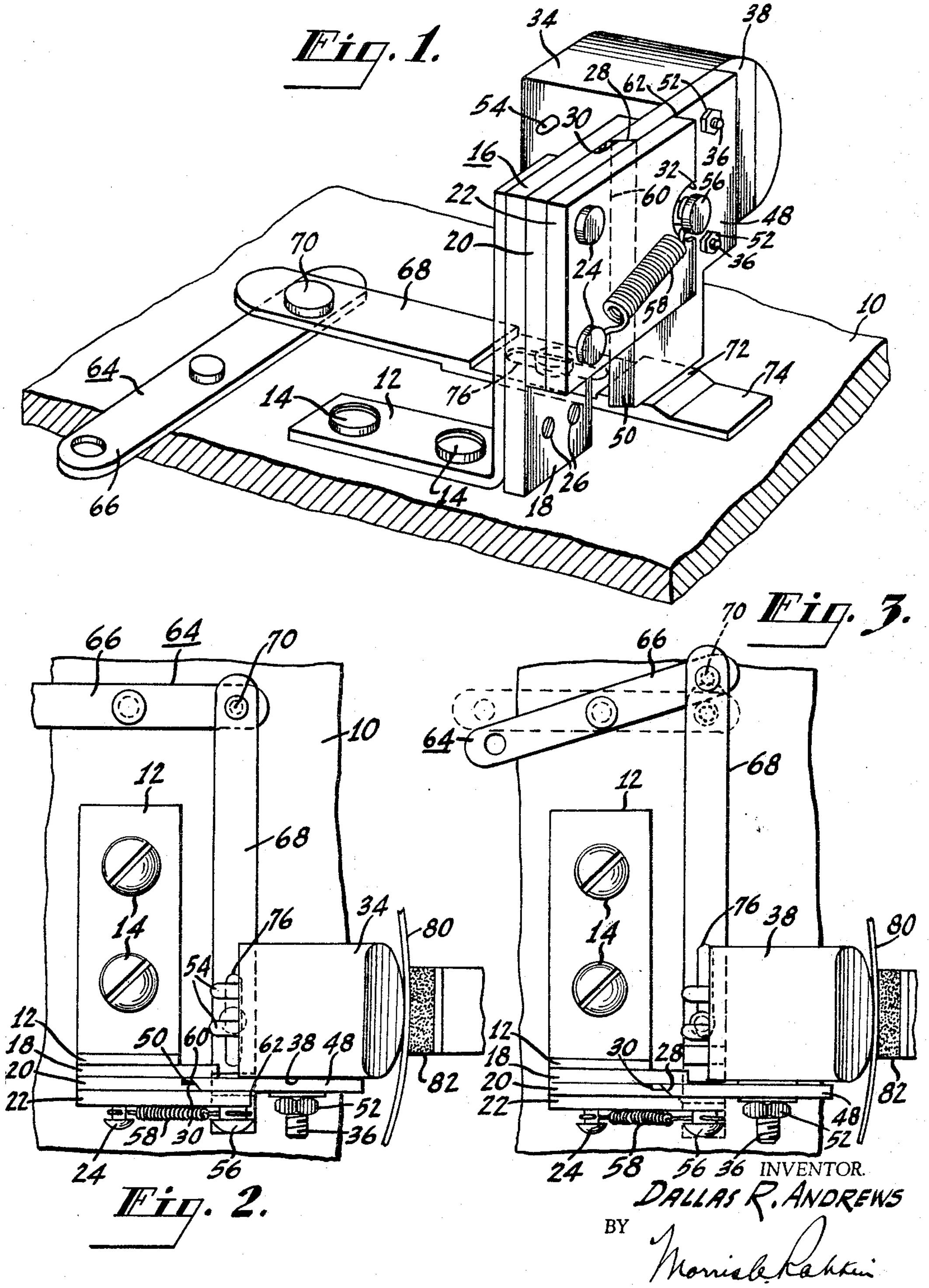
FIG. 1 is a perspective view of a mechanism for shifting a magnetic head, said mechanism being in accordance with one embodiment of the invention.
FIG. 2 is a top plan view of the mechanism shown in FIG. 1 in one position of operation.
FIG. 3 is a view similar to FIG. 2, but with the mechanism in another position of operation.

Referring more particularly to FIGS. 1 to 4, there is shown a portion of the deck plate 10 of a magnetic tape machine, the machine also being known as a tape transport. This machine may be of the type TCT–3 sold by the RCA Sales Corporation, 600 North Sherman Drive, Indianapolis, Indiana, and described in their Service Data, identified as "File: 1961 No. 15." Reference may be had to the Service Data for a description of those parts of the tape transport, aside from the mechanism described herein, which may also be mounted on the deck plate 10.

An L-shaped bracket 12 is attached to the deck plate 10 by two screws 14. A head retainer assembly 16 is attached to the upstanding leg of the bracket 12. Three plates 18, 20, and 22, which are riveted together in side-by-side relationship by two rivets 24, are included in the head retainer assembly 16. The inside plate 18 is generally in the form of a solid block letter "P," i.e., one in which the opening is omitted. Screws 26, which extend through the inside plate 18 and are threaded into the upstanding leg of the bracket 12, hold the head retainer assembly 16 onto and against the bracket 12. Sufficient clearance may be provided in holes in the plate 18 through which the screws 26 pass for adjustment of the position of the assembly 16. The outside plate 22 of the bracket is larger widthwise than the inside plate 18 and encompasses that part of the area of the inside plate 18 corresponding to the top of its letter P shape. The middle plate 20 is sandwiched between the inside and outside plates 18 and 22 and is shorter than both the inside and outside plates 18 and 22. Accordingly, a vertical slot is defined in the assembly between the inside and outside plates 18 and 22. The exterior extremity or bottom of the slot is defined by a beveled edge 28 of the middle plate 20. The corner of the middle plate 20 where the beveled edge 28 intersects the side surface of the inside plate 18 has a vertically extending rectangular notch 30 therein. The beveled edge 28 and the inner surfaces of the inside and outside plates 18 and 22 are desirably lapped flat, smooth and parallel to each other. A circular notch 32 is provided in the inside plate 18.

A magnetic head 34, which may be of the type known in the art and used in the aforementioned TCT–3 tape transport, may have one or two head units 44 and 46 therein depending upon whether or not stereophonic or monaural recording and reproduction is desired. This head has a pair of threaded lugs 36 which extend outwardly therefrom. Also, at least one side face 38 of the head 34 is parallel to the line (known as the "gap line") through the signal gaps 40 and 42 of the head units 44 and 46 of the head 34. The signal gaps 40 and 42 are in alignment with each other along the gap line. A generally solid block P-shaped bracket plate 48 is provided having side faces, which are made flat and parallel to each other, as by lapping, and a beveled edge 50 which also is lapped smooth and flat and desirably at the same angle as the beveled edge 28 of the middle plate 20 of the head retainer assembly 16. For example, the bevel of both the bracket plate edge 50 and the middle head retainer plate edge 28 may be complementary angles of 45°. The smooth, flat side face 38 of the head 34 is juxtaposed against the side face of the head bracket plate 48. The lugs 38 may extend through slots (not shown) in the bracket plate 48, and nuts 52, threaded around these lugs 36, securely attach the head to the bracket plate 48. Sufficient clearance may be provided in the slots through which the lugs 36 extend, so that the vertical height of the heads 44 and 46 may be adjusted.

The bracket plate 48 extends beyond the back face of the head 34. Terminals 54, to which electrical connections are made to the head 34, also extend through the back face of the head. A rivet 56 is attached to the plate 48 with the rivet axis perpendicular to the side face of the plate through which the lugs 36 extend. The bracket plate 48 with the head 34 attached thereto is disposed so that the rivet 56 is in the slot 32 defined in the head retainer assembly 16. Since the angles of the beveled edges 50 and 28 are complementary, and since the opposed surfaces of the plates 18 and 22 which define the slot therebetween and the surfaces of the bracket plate 48 which enter the slot are all lapped flat and smooth, a good sliding fit of the bracket plate 48 in the head retainer assembly 16 is obtained. The notch 30 provides clearance for the bracket plate beveled edge 50 and prevents binding, and facilitates intimate contact between the beveled edges 28 and 50.

A spring 58 interconnects one of the rivets 24 which extends from the outside plate 22 and the rivet 56 which extends into the notch 32 in the outside plate. The spring biases the head bracket plate into the head retainer assembly 16 and, since it is attached on the side of the bracket plate 48 opposite from the corner 60 of the beveled edge 50 of the bracket plate 48, the spring 58 exerts a torque or twisting force upon the bracket plate which tends to bring the edge of the bracket plate 48 at the corner 60 of the beveled edge 50 into contact with the inner surface of the inside plate 18 in the region where the vertical notch 32 is provided. Also, the torque exerted by the spring 58 brings the inner surface of the outside plate 22 into intimate contact with its adjacent surface of the bracket plate 48. There are then two regions of intimate contact between the bracket plate 48 and the head retainer assembly 16; viz., one along a line defined by the corner 60 of the beveled edge 50 and the other along a line defined by the inner corner 62 of the outside plate 22.

Since the record tracks to be scanned are parallel to the edges of the tape, the gap line is desirably perpendicular to the edges of the tape. As mentioned above, the gap line is parallel to the side face 38 of the head 34. The corner 60 of the beveled edge 50 of the head bracket plate 48 is adjusted so as to be parallel to the gap line, as by means of the lugs 36 and nuts 52, for example, in a suitable alignment fixture. The inner surfaces of the plates 18 and 22 and the beveled edge 28 in the retainer assembly 16 are also adjusted, as by means of the screws 26 so that these inside surfaces and beveled edge 28 are also perpendicular to the tracks on the tape. It follows that the lines of intimate contact at the corners 60 and 62 between the bracket plate 48 and the head retainer assembly 16 are parallel to the gap line. The head 34 then moves along a line parallel to the gap line, which line of movement is defined by the line of intimate contact at the corner 60. Any angular movement which might cause a change in azimuth of the gap line is retarded by the line of intimate contact at the corner 62 which also guides the movement of the head 34.

The head is shifted vertically from a position in scanning relationship with one pair of tracks to a second position in scanning relationship with another pair of tracks by a linkage 64 including the lever 66 and a slide 68 which is pivotally linked to the lever 66 at a pivot 70. The lever 66 is pivotally mounted at the center thereof. The free end of the lever may be conected to a control (not shown) which selects the desired pair of tracks to be scanned. The control may include detents, such as a toggle mechanism, as in the aforementioned TCT–3 tape transport, for latching the control in either selected position. The slide 68 has an upper step 72 and a lower step 74 on which the bottom of the head mounting bracket 48 rests. A pin and slot arrangement 76 guides the slide along a path extending across the bottom of the head mounting bracket 48.

Figure 4:
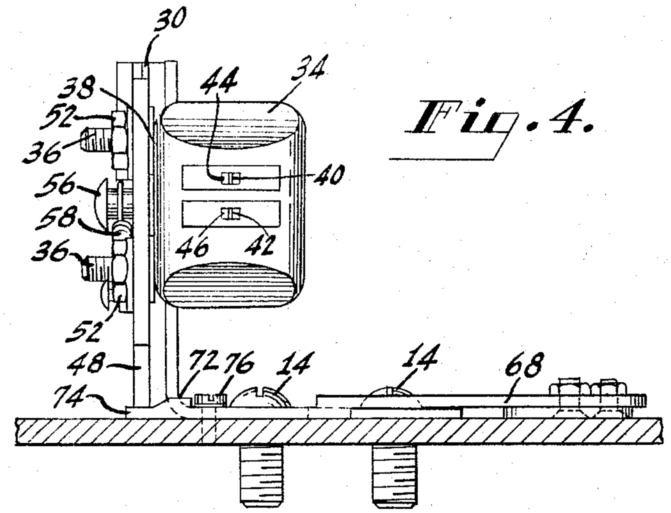
FIG. 4 is a front elevational view of the mechanism shown in FIG. 1.

FIGS. 1 and 2 show the slide 68 in position with the head mounting bracket resting on the upper step 72 thereof, and FIGS. 3 and 4 show the slide in a position with the head resting on the lower step 74. The magnetic head 34 may be pressed in engagement with a tape record 80 by a pressure pad 82 while the vertical position thereof is adjusted. However, it is preferable for the pressure pad 82 to be withdrawn away from the head, as by setting the tape reeling control in the step of threading position, when the vertical position of the head is to be shifted.

Figure 5:
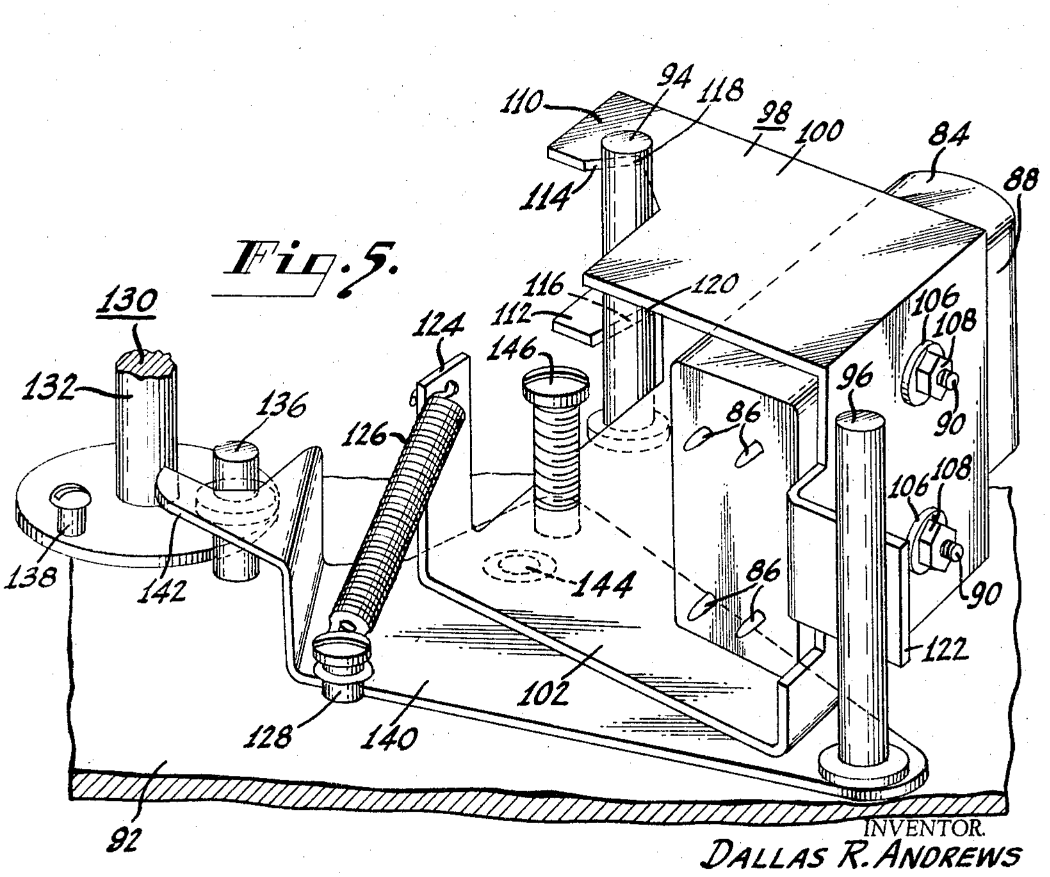
FIG. 5 is a perspective view of a mechanism for positioning a magnetic head in accordance with another embodiment of the invention.
Figure 6:
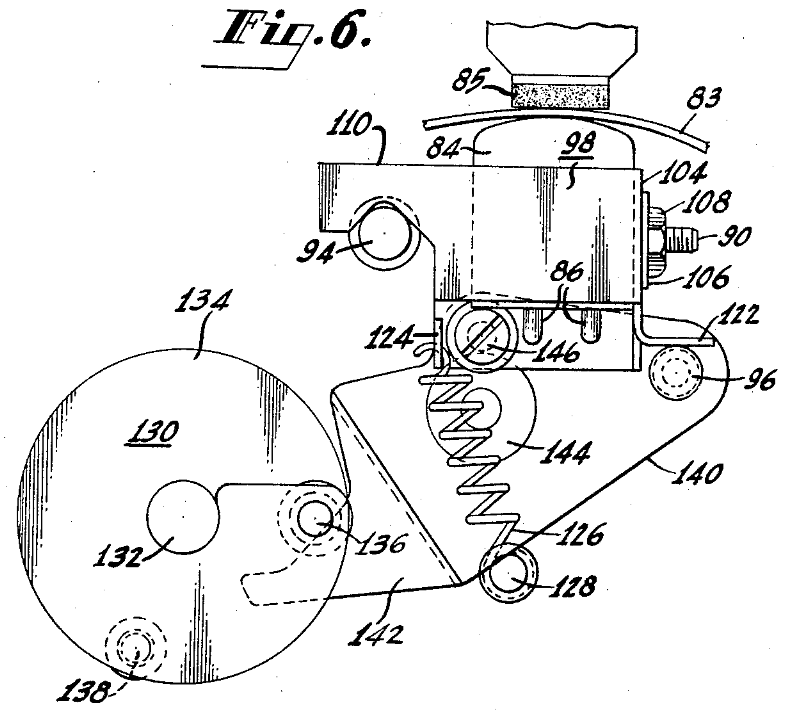
FIG. 6 is a top plan view of the mechanism shown in FIG. 5.
Figure 7:
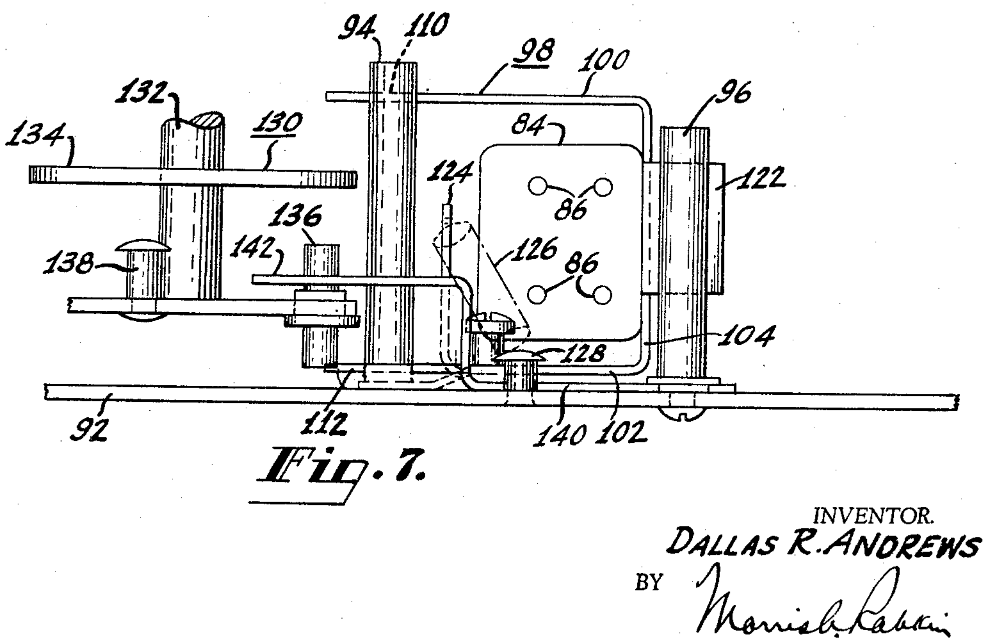
FIG. 7 is a rear elevational view of the mechanism shown in FIG. 5.

A mechanism in accordance with another embodiment of the invention for controlling the position of a magnetic head 84 is illustrated in FIGS. 5, 6 and 7. The magnetic head 84 may be similar to the magnetic head 34. Electrical input-output terminals 86 are provided on the back face of the head, and electrical connections to the head units may be made to these head terminals. A side face 88 of the head 84 may be flat and parallel to the gap line of the head units in the head 84. Threaded lugs 90 project from this side face. As in the TCT–3 tape transport, a deck plate 92 is provided on which the components of the transport may be mounted, the mechanism for mounting and positioning the head 84 being shown in FIGS. 5 to 7. The tape 83 is driven across the head 84 and may be pressed thereagainst by a pressure pad 85. The edges of the tape and the tracks thereon may be approximately parallel to the surface of the deck plate 92. A pair of cylindrical posts 94 and 96 are secured to the deck plate with their axes parallel to each other and perpendicular to the record tracks on the tape to be scanned by the head 84. A head mounting bracket 98 is provided. This bracket is essentially a U-shaped member which may be cut from sheet metal stock and bent into U shape. The bracket 98 includes upper and lower horizontal legs 100 and 102, respectively, and a vertical leg 104 (corresponding to the base of the U) which is perpendicular to the upper and lower legs 100 and 102. The head 84 is disposed in the interior of the bracket 98. The side face 88 of the head is held against the inside face of the vertical base leg 104 and fastened thereagainst by means of washers 106 and nuts 108 on the lugs 90. Slots and holes which are larger than the lugs 90 may be provided in the vertical leg 104 so that the vertical position and tilt of the head 84 can be adjusted.

Extensions 110 and 112 of the upper and lower legs 100 and 102, respectively, are provided with V notches 114 and 116. These notches 114 and 116 may have sides inclined 45° with respect to each other and are desirably in alignment with each other, i.e., the apexes 118 and 120 are along a vertical line perpendicular to the upper and lower horizontal legs 100 and 102. The post 94 fits into the notches 114 and 116 so that the notches act as V guides for the head mounting bracket.

A tab 122 is bent back perpendicularly to the vertical leg 104 of the bracket 98 and is adapted to engage the other post 96. The post 96 and the post 94 cooperate in the guidance of the head during the vertical positioning thereof to define a path of vertical movement for the head mounting bracket along a line parallel to the axis of the post 94. Since the posts' axes are perpendicular to the record tracks on the tape and since the gap line of the head 84 is also perpendicular to the tracks on the tape, the post 94 and V notches 114 and 116 and post 96 and tab 122 define a path of movement for the head parallel to the gap line.

Another tab 124 is bent up from the lower leg 102. A spring 126 is connected between a lug 128 secured in the deck plate 92. The spring 126 biases the bracket 98 into engagement with the guide posts 94 and 96. Thus, the bracket is guided at three points or regions, namely, at the two V notches 114 and 116 and at the tab 122. The bias due to the spring 126 brings the posts 94 and 96 into intimate contact with the bracket 98 at the aforementioned three points. The path of movement of the head along a line perpendicular to the gap line is defined by the post 94. The V notches also prevent displacement of the gap line in azimuth with vertical movement of the head. The tab 122 and the post 96 prevent tilting of the head and displacement thereof away in the direction from the tape.

A control 130 is provided for shifting the head. This control includes a shaft 132 having a disc 134 mounted thereon for rotation therewith. A pair of posts 136 and 138, the latter of which may be a rivet, are mounted radially offset from the center of the disc and spaced from each other with their axes parallel to the axis of the shaft 132. The post 136 may also operate the pressure roller mechanism of the tape transport. The control operates a lever 140 which is pivotally mounted around the post 96. The lever 140 has an upwardly stepped portion 142, the edges of which have cam surfaces. The post 136 of the control 130 is engageable with the inner cam surface of the stepped portion 142, while the other post 138 is engageable with the outer cam surface of the stepped portion 142. A dimple-like protrusion 144 having a plateau-like top projects upwardly from the lever 140. A bolt 146 is threaded into the lower leg 102 of the bracket 98. The bottom of this bolt 146 rides on the upper surface of the lever 140 and also onto and off of the protrusion as the lever pivots.

When the shaft 132 is turned in a clockwise direction, the lever 140 turns to the position shown in FIG. 5. The bottom of the bolt 146 then rides on the flat surface of the lever 140 and the heads are in a first (lower) position. When the shaft 132 is turned in a counter-clockwise direction, the post 138 engages the outer cam surface of the stepped portion 142 and pivots the lever in a clockwise direction. The protrusion 144 is then brought under the base of the bolt 146 and lifts the bolt, thereby shifting the head bracket 98 and the head 84 upwardly to its second (upper) position. A suitable detent mechanism, such as a toggle linkage, as used in the reeling control of the TCT–3 tape transport, may be provided for latching the control 132 in its clockwise position of rotation, as shown in FIG. 5, or in its counter-clockwise position of rotation.

From the foregoing description, it will be apparent that there have been provided improved mechanisms for changing the position of a magnetic head from a first position to a second position, the same desired positional relationship of the head with respect to a tape record being maintained in either position. It will be appreciated that the head may be shifted among several positions, for example, more than two steps when more than one protrusion is provided to obtain the several head positions. Other variations and modifications, within the spirit and scope of the invention, will undoubtedly become apparent to those skilled in the art. Accordingly, the foregoing description should be taken merely as illustrative and not in any limiting sense.

What is claimed is:

1. A mechanism for shifting the position of a magnetic head into scanning relationship with selected ones of a plurality of record tracks on a magnetic tape record, said head having at least one head unit including a signal gap disposed along a gap line, said mechanism comprising (a) a stationary mounting member defining a slot having side and bottom walls parallel to said gap line, said bottom wall being beveled, (b) a bracket plate mounting said head and disposed in said slot, said bracket plate having a beveled edge complementary to said beveled bottom wall, the corner of said beveled edge being parallel to said gap line, (c) means for tilting said bracket plate toward at least one of said side walls of said slot and providing lines of intimate contact between said plate and the walls of said slot at said corner and at the side of said bracket plate adjacent said one side wall, and (d) means for moving said bracket in said slot in a direction along said lines of contact whereby to shift said head among selected ones of said tracks.

2. Mechanism for shifting the position of a magnetic head into scanning relationship with selected ones of a plurality of record tracks which are laterally offset from each other across a magnetic tape record, said head having at least one head unit including a signal gap disposed along a gap line, said mechanism comprising (a) a bracket plate having side faces and a beveled edge, said magnetic head being mounted on said bracket plate with its gap line, said side faces and said beveled edge all parallel to each other, (b) a retainer assembly including three plates having their faces juxtaposed against each other and defining a slot, the middle one of said plates having a beveled edge complementary to said bracket plate beveled edge and defining the bottom of said slot, said middle plate beveled edge and the sides of said three plates which define said slot all being parallel to each other, (c) said bracket plate being slidably disposed in said slot with its beveled edge and said middle plate beveled edge adjacent each other, (d) a spring connected between (1) the one of the side faces of said bracket plate opposite to the side face of said bracket plate which, with said beveled edge of said bracket plate, defines the extreme corner of said bracket plate beveled edge, and (2) the outside one of said assembly plates adjacent to said opposite side face of said bracket plate, said spring urging said bracket plate into said corner of said bracket plate beveled edge toward said one side face of said bracket plate, and (e) means for sliding said bracket plate in said slot whereby to shift said head laterally among selected ones of said record tracks.

3. In apparatus for scanning a plurality of record tracks by means of a magnetic head having a head unit including a signal gap disposed along a gap line, the improvement comprising (a) a pair of stationary posts spaced from each other and having their axes parallel to each other, (b) a bracket for mounting said magnetic head, said bracket having a pair of V notches in alignment with each other along a line parallel to said gap line, said bracket also having a portion presenting a surface parallel to said gap line, (c) means for engaging said V notches with one of said posts and simultaneously engaging said bracket portion surface with the other of said posts, and (d) means engageable with said bracket for shifting said bracket in a direction along the axes of said posts whereby to bring said head unit into scanning relationship with selected ones of said tracks.

4. In apparatus for scanning a plurality of record tracks by means of a magnetic head having a head unit including a signal gap disposed along a gap line, the improvement comprising (a) a pair of stationary posts spaced from each other and having their axes parallel to each other and substantially perpendicular to said tracks, (b) a bracket for mounting said magnetic head, said bracket having a pair of V notches in alignment with each other along a line parallel to said gap line, said bracket also having a portion presenting a surface parallel to said gap line, (c) spring means connected to said bracket for biasing said V notches against one of said posts and said bracket portion surface against the other of said posts, and (d) control means including a lever having a protrusion engageable with said bracket for shifting said bracket in a direction along the axes of said posts whereby to bring said head unit into scanning relationship with selected ones of said tracks.

References Cited by the Examiner

UNITED STATES PATENTS

| | | | |
|---|---|---|---|
| 2,831,180 | 4/1958 | Hosbrouck | 179—100.2 |
| 2,933,319 | 4/1960 | Proctor | 179—100.2 |

NORTON ANSHER, *Primary Examiner.*

CLIFFORD B. PRICE, *Assistant Examiner.*